(12) United States Patent
Nishimoto et al.

(10) Patent No.: US 7,313,061 B2
(45) Date of Patent: Dec. 25, 2007

(54) OPTICAL PICKUP HAVING A PLURALITY OF PHOTODETECTORS DIVIDED INTO FOUR REGIONS USED TO OBTAIN BOTH FOCUS AND TRACKING ERROR SIGNALS

(75) Inventors: Masahiko Nishimoto, Osaka (JP);
Shinichi Hamaguchi, Hyogo (JP);
Tatsuya Nakamori, Kyoto (JP);
Yasuyuki Kochi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 5 days.

(21) Appl. No.: 10/527,084

(22) PCT Filed: Sep. 8, 2003

(86) PCT No.: PCT/JP03/11466

§ 371 (c)(1),
(2), (4) Date: Mar. 10, 2005

(87) PCT Pub. No.: WO2004/025636

PCT Pub. Date: Mar. 25, 2004

(65) Prior Publication Data

US 2006/0023608 A1 Feb. 2, 2006

(30) Foreign Application Priority Data

Sep. 10, 2002 (JP) .............................. 2002-264540

(51) Int. Cl.
*G11B 7/00* (2006.01)

(52) U.S. Cl. .............................. 369/44.37; 369/112.1; 369/44.41; 369/112.12

(58) Field of Classification Search ............. 369/44.12, 369/44.37, 112.15, 112.12, 44.41
See application file for complete search history.

(56) References Cited

U.S. PATENT DOCUMENTS 5,049,732 A * 9/1991 Nagahama et al. ...... 250/201.5

(Continued)

FOREIGN PATENT DOCUMENTS

JP 11-149652 A 8/1999

(Continued)

*Primary Examiner*—Wayne Young
*Assistant Examiner*—LaTanya Bibbins
(74) *Attorney, Agent, or Firm*—McDermott Will & Emery LLP

(57) ABSTRACT

An optical pickup comprises: first and second semiconductor lasers (11, 14); a hologram element (17) for diffracting light reflected by an optical information recording medium (9 or 12); and a plurality of photodetectors (18-23). The hologram element (17) has two or more different diffraction regions. The plurality of photodetectors (18-23) are provided away from the first and second semiconductor lasers (11, 14) at both sides thereof along an extended line of a line between light emission positions of the first and second semiconductor lasers (11, 14). The diffracted light generated from the light beam of the first wavelength (10) by the hologram element (17) and the diffracted light generated from the light beam of the second wavelength (13) by the hologram element (17) are collected at substantially the same position at one side, and part (18, 19) of the plurality of photodetectors (18-23) are provided at the position. Signals obtained from the photodetectors (18-23) at the both sides are used to obtain a focus error signal and a tracking error signal.

7 Claims, 12 Drawing Sheets

U.S. PATENT DOCUMENTS

| | | | |
|---|---|---|---|
| 6,212,140 B1* | 4/2001 | Kimura et al. | 369/44.15 |
| 6,556,532 B2* | 4/2003 | Ogawa et al. | 369/112.16 |
| 6,928,035 B2* | 8/2005 | Komma et al. | 369/44.37 |
| 2002/0093893 A1* | 7/2002 | Matsuda | 369/44.41 |
| 2002/0097660 A1* | 7/2002 | Komma et al. | 369/112.04 |
| 2003/0007436 A1* | 1/2003 | Komma et al. | 369/53.2 |

FOREIGN PATENT DOCUMENTS

| | | |
|---|---|---|
| JP | 2000-348368 A | 12/2000 |
| JP | 2001-176119 A | 6/2001 |
| JP | 2002-008258 A | 1/2002 |
| JP | 2002-109759 A | 4/2002 |
| JP | 2003-223728 A | 8/2003 |

* cited by examiner

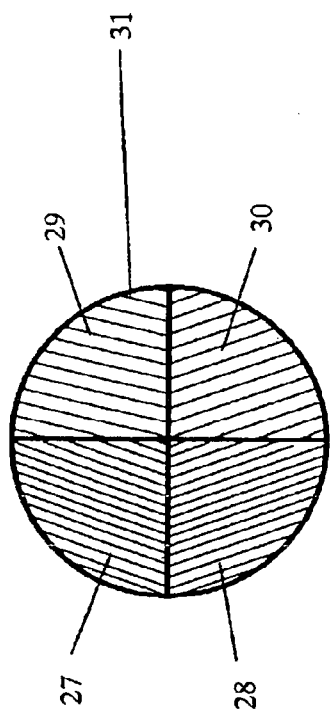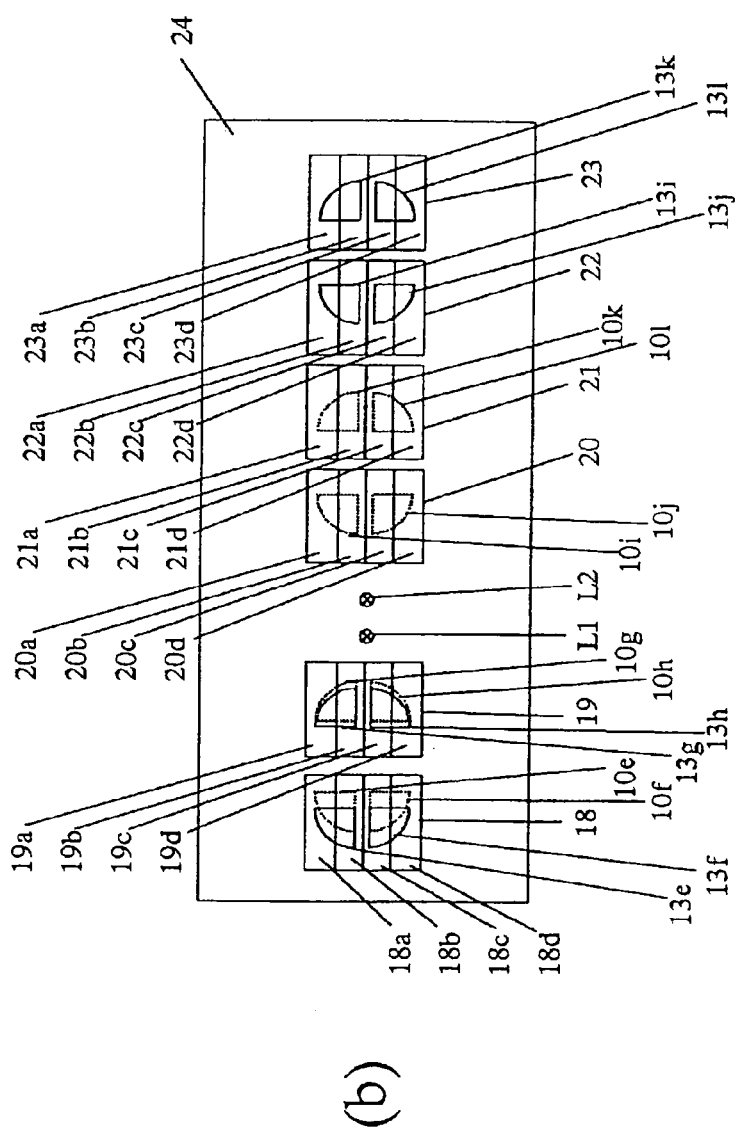
FIG. 4

US 7,313,061 B2

1

OPTICAL PICKUP HAVING A PLURALITY OF PHOTODETECTORS DIVIDED INTO FOUR REGIONS USED TO OBTAIN BOTH FOCUS AND TRACKING ERROR SIGNALS

TECHNICAL FIELD

The present invention relates to an optical pickup. Specifically, the present invention relates to an optical information processing device for recording, reproducing or erasing information on an optical information recording medium, such as an optical disc, or the like, which has a function of detecting a reproduction signal and various servo signals used in an optical head which is a principal component of the device.

BACKGROUND ART

Presently, recording/reproduction of data on/from CD (Compact Disc), which constitutes the largest part of the optical disk market, is carried out using a near infrared semiconductor laser which operates in 780 nm to 820 nm wavelength band. On the other hand, recording/reproduction of data on/from DVD (Digital Versatile Disc), a rapidly-spreading, high-density optical information recording medium, requires a smaller optical spot and is therefore carried out using a red semiconductor laser which operates at a shorter wavelength in 635 nm to 680 nm band. It has been demanded for a single device to realize recording/reproduction on two kinds of discs which are based on different standards. A conventional device conceived to meet such a demand is shown in FIG. 12 (see, for example, Japanese Unexamined Patent Publication No. 11-149652). Hereinafter, the operation principle of this conventional optical pickup is described.

A semiconductor laser 1 which operates at 650 nm is used for reproduction from DVD. A light beam emitted by the semiconductor laser 1 enters a microprism 3 and is reflected by a reflection surface of the microprism 3. The reflected beam passes through a collimator lens (not shown) and an objective lens (not shown) to be collected on a disc (not shown). The light beam is reflected by the surface of the disc (not shown) and again passes through the objective lens and the collimator lens to enter a hologram element 4. The light beam is branched by the hologram element 4 and reflected by the microprism 3 to enter a plurality of photodetectors 5, 6, 7 and 8. In a reproduction operation from DVD, focus/tracking error signals and a reproduction signal are detected based on signals detected in the photodetectors 5, 6, 7 and 8.

On the other hand, a semiconductor laser 2 which operates at 780 nm is used for reproduction from CD. A light beam emitted by the semiconductor laser 2 enters a microprism 3 and is reflected by a reflection surface of the microprism 3. The reflected beam passes through the collimator lens (not shown) and the objective lens (not shown) to be collected on a disc (not shown). The light beam is reflected by the surface of the disc (not shown) and again passes through the objective lens and the collimator lens to enter a hologram element 4. The light beam is branched by the hologram element 4 and reflected by the microprism 3 to enter a plurality of photodetectors 5, 6, 7 and 8. In a reproduction operation from CD, focus/tracking error signals and a reproduction signal are detected based on signals detected in the photodetectors 5, 6, 7 and 8. Since this structure incorporates

2 the semiconductor laser 2 which operates at 780 nm, reproduction from a write once read many CD (CD-R) is also possible.

Meanwhile, an example of a method for detecting focus/tracking error signals in an optical pickup which uses lasers of different wavelengths is disclosed in Japanese Unexamined Patent Publication No. 2001-176119.

However, in the conventional optical device shown in FIG. 12, after being reflected by the disc, the light beam of the semiconductor laser 1 and the light beam of the semiconductor laser 2 are branched by the hologram element 4 at different diffraction angles because the semiconductor laser 1 and the semiconductor laser 2 have different emission wavelengths. As a result, the diffracted light beam of the semiconductor laser 1 and the diffracted light beam of the semiconductor laser 2 form light spots at different positions over the surface of the photodetectors. Although only a component of the diffracted light, e.g., only +1st order light, can be collected at the same spot position irrespective of the difference in wavelength by particular division of the hologram element, the other diffracted light components, e.g., −1st order light, and the like, cannot be collected at the same spot positions.

Thus, in the conventional structure, the photodetector for the light beam of the semiconductor laser 1 and the photodetector for the light beam of the semiconductor laser 2 have to be provided independently of each other.

However, the independently-provided photodetectors are located at positions vicinal to each other, and therefore, it is difficult to provide another photodetector between the photodetectors. Thus, the arrangement of the photodetectors is restricted, and the location and design flexibility of the photodetectors is decreased, so that stable detection of focus/tracking error signals cannot be achieved.

Japanese Unexamined Patent Publication No. 2001-176119 discloses a focus/tracking error signal detection method which addresses the above problem. According to this method, as for each wavelength, only one direction of ±1st order diffracted light is used for detection of a focus error signal or tracking error signal. Thus, the stability of detection of the focus/tracking error signals is insufficient in view of the use efficiency of light.

The present invention was conceived in view of such circumstances. A primary objective of the present invention is to provide an optical pickup capable of detecting focus/tracking error signals such that more stable recording and reproduction are realized. Another objective of the present invention is to provide an optical pickup capable of operating on various optical information recording media that are used with semiconductor laser light of different wavelengths, characterized by the location and design flexibility of the photodetectors, and capable of detecting focus/tracking error signals such that more stable recording and reproduction are realized.

DISCLOSURE OF INVENTION

An optical pickup of the present invention comprises: a first semiconductor laser for emitting a light beam of a first wavelength; a second semiconductor laser for emitting a light beam of a second wavelength, the second wavelength being different from the first wavelength; a hologram element for diffracting reflected light generated by reflecting any one of the light beam of the first wavelength and the light beam of the second wavelength by an optical information recording medium; and a plurality of photodetectors for receiving the diffracted light from the hologram element, wherein the hologram element has two or more different diffraction regions, the plurality of photodetectors are provided away from the first semiconductor laser and the second semiconductor laser at both sides of a laser region including the first semiconductor laser and the second semiconductor laser, the photodetectors being provided along an extended line of a line between a light emission position of the first semiconductor laser and a light emission position of the second semiconductor laser, the diffracted light generated from the light beam of the first wavelength by the hologram element and the diffracted light generated from the light beam of the second wavelength by the hologram element are collected at substantially the same position in an area at one of the both sides, part of the plurality of photodetectors being provided at the position, and signals obtained from the photodetectors at the both sides are used to obtain a focus error signal and a tracking error signal.

In one preferred embodiment, the number of the photodetectors provided at the other side is greater than that of the photodetectors provided at the one side.

In one preferred embodiment, at least one of the photodetectors provided at the other side has a longer dimension in the direction of the extended line than those of the photodetectors provided at the one side.

Another optical pickup of the present invention comprises: a first semiconductor laser for emitting a light beam of a first wavelength; a second semiconductor laser for emitting a light beam of a second wavelength, the second wavelength being different from the first wavelength; a diffraction grating for dividing any one of the light beam emitted by the first semiconductor laser and the light beam emitted by the second semiconductor laser into a 0th order main beam and ±1st order sub-beams; a hologram element for diffracting reflected light generated by reflecting the 0th order main beam and the ±1st order sub-beams by an optical information recording medium; and a plurality of photodetectors for receiving the diffracted light from the hologram element, wherein the hologram element has two or more different diffraction regions, photodetectors for receiving the diffracted light generated from the 0th order main beam by the hologram element are provided away from the first semiconductor laser and the second semiconductor laser at both sides of the first and second semiconductor lasers, the photodetectors being provided along an extended line of a line between a light emission position of the first semiconductor laser and a light emission position of the second semiconductor laser, the diffracted light generated from the 0th order main beam of the first wavelength by the hologram element and the diffracted light generated from the 0th order main beam of the second wavelength by the hologram element are collected at substantially the same position in an area at one of the both sides, the photodetectors being provided at the position, and signals obtained from the photodetectors at the both sides are used to obtain a focus error signal and a tracking error signal.

In one preferred embodiment, the number of the photodetectors provided at the other side for receiving the diffracted light derived from the 0th order main beam is greater than that of the photodetectors provided at the one side for receiving the diffracted light derived from the 0th order main beam.

In one preferred embodiment, at least one of the photodetectors provided at the other side for receiving the diffracted light derived from the 0th order main beam has a longer dimension in the direction of the extended line than those of the photodetectors provided at the one side for receiving the diffracted light derived from the 0th order main beam.

In one preferred embodiment, the second wavelength of the light beam of the second semiconductor laser is longer than the first wavelength of the light beam of the first semiconductor laser.

In one preferred embodiment, at least at a side behind the first semiconductor laser when viewed from the position of the second semiconductor laser, when diffracted light generated by the hologram element from the light beam of the first wavelength reflected by an information recording medium and diffracted light generated by the hologram element from the light beam of the second wavelength reflected by an information recording medium have the same diffraction order, these diffracted light impinge on the same photodetector.

According to the present invention, diffracted light collected at different positions can be effectively used as focus/tracking error signals. Thus, the location flexibility of the photodetectors is not largely decreased. Further, in the case of an arrangement where diffracted light having the same diffraction order impinge on the same photodetector, the number of photodetectors can be decreased, and as a result, the size of a device is decreased.

According to an optical pickup of the present invention, diffracted light generated from a light beam of the first wavelength by a hologram element and diffracted light generated from a light beam of the second wavelength by a hologram element are collected at substantially the same position in an area at one of the both sides, and part of the plurality of photodetectors are provided at the position. Thus, focus/tracking error signals are detected such that more stable recording and reproduction are realized. Furthermore, signals obtained from the photodetectors at the both sides are used to obtain a focus error signal and a tracking error signal. Thus, a larger amount of light can be used as compared with a case where signals obtained from the photodetectors at only one side are used. Also with such a feature, the focus/tracking error signals can be detected such that more stable recording and reproduction are realized.

BRIEF DESCRIPTION OF DRAWINGS

FIG. 2(a) is a plan view showing a structure of a hologram element. FIG. 2(b) is a plan view showing a structure of photodetectors.

FIG. 4 schematically shows a structure of components of the optical device according to embodiment 2 of the present invention. FIG. 4(a) is a plan view showing a structure of a hologram element. FIG. 4(b) is a plan view showing a structure of photodetectors.

FIG. 11(a) is a plan view showing a structure of a hologram element. FIG. 11(b) is a plan view showing a structure of photodetectors.

BEST MODE FOR CARRYING OUT THE INVENTION

Hereinafter, embodiments of the present invention are described with reference to the drawings. It should be noted that the present invention is not limited to the embodiments described below.

Embodiment 1

Figure 1:
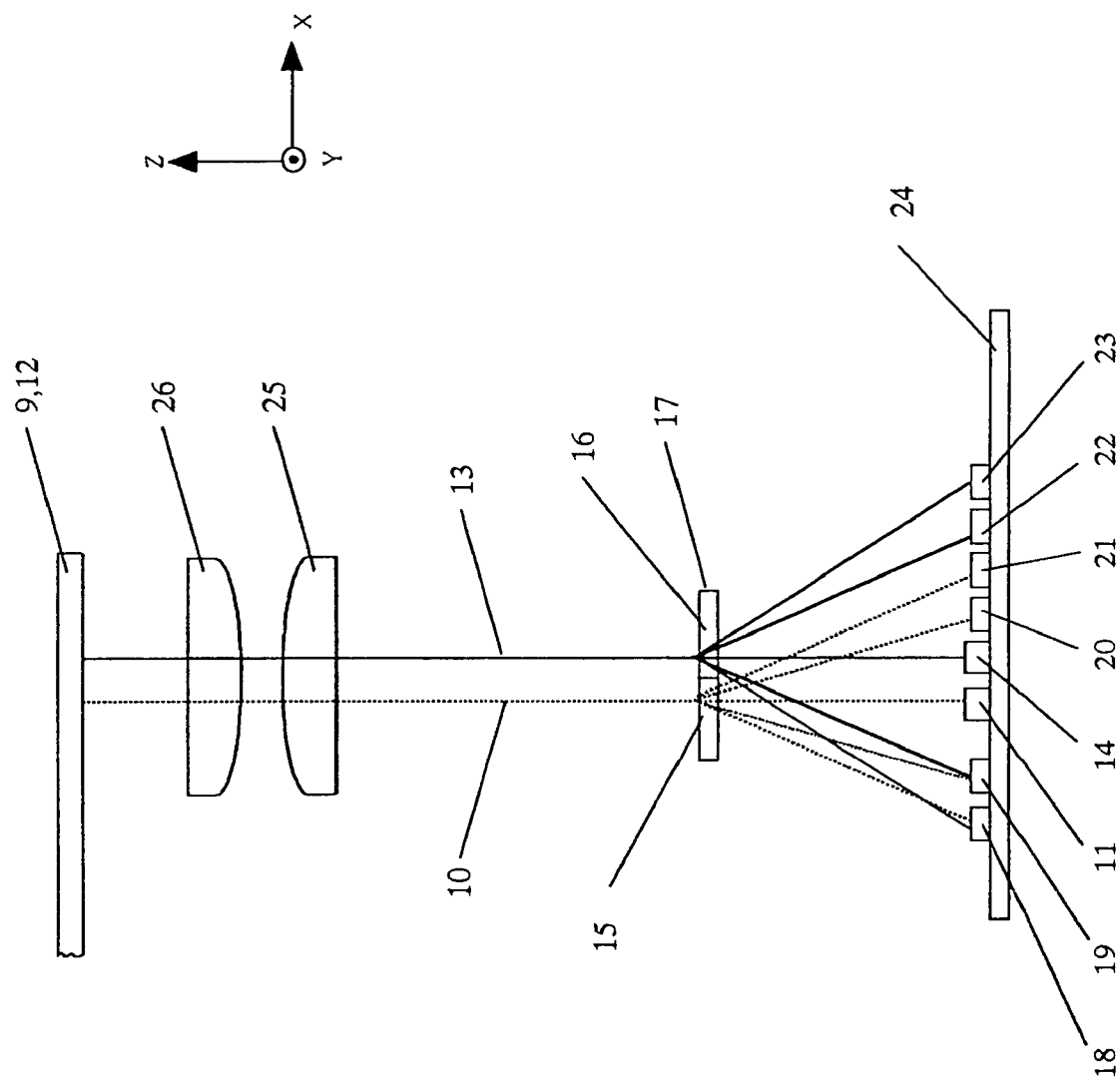
FIG. 1 is a schematic cross-sectional view of an optical device according to embodiment 1 of the present invention.

FIG. 1 schematically shows a structure of an optical device according to embodiment 1 of the present invention. FIGS. 2(a) and 2(b) are plan views respectively showing a structure of a hologram element and a structure of photodetectors according to embodiment 1 of the present invention.

The optical device shown in FIG. 1 includes: a first semiconductor laser 11 for emitting a light beam 10 which has a first wavelength corresponding to recording/reproduction of a first optical information recording medium 9; a second semiconductor laser 14 for emitting a light beam 13 which has a second wavelength corresponding to recording/reproduction of a second optical information recording medium 12; a hologram element 17 which has a first diffraction region 15 and a second diffraction region 16 for diffracting the light beam 10 of the first wavelength and the light beam 13 of the second wavelength; and a first photodetector 18, a second photodetector 19, a third photodetector 20, a fourth photodetector 21, a fifth photodetector 22 and a sixth photodetector 23 for receiving diffracted light from the hologram element 17, which are provided on the same integrated substrate 24. The optical device of FIG. 1 further includes a collimator lens 25 and an objective lens 26 between the hologram element 17 and the optical information recording medium 9 or 12.

The plan view of FIG. 2(b) shows an apparent emission point L1 of the first semiconductor laser 11 and an apparent emission point L2 of the second semiconductor laser 14.

Next, an operation of the optical device of embodiment 1 is described.

At the first step, optical information recording medium determination means (not shown) determines which of the first optical information recording medium 9 and the second optical information recording medium 12 is to be used. If it is the first optical information recording medium 9, the first semiconductor laser 11 of the first wavelength is driven. If it is the second optical information recording medium 12, the second semiconductor laser 14 of the second wavelength is driven. The light beam 10 emitted by the semiconductor laser 11 (dotted line in FIG. 1) or the light beam 13 emitted by the semiconductor laser 14 (solid line in FIG. 1) passes through the collimator lens 25 and the objective lens 26 to be collected on and reflected by the optical information recording medium 9 or 12. The reflected light again passes through the objective lens 26 and the collimator lens 25 to enter the hologram element (light beam branching means) 17.

The light beam 10 of the first wavelength reflected by the optical information recording medium 9 is diffracted by the first diffraction region 15 of the hologram element 17 in the X direction (shown in FIG. 1) such that ±1st order diffracted light reach the first photodetector 18 and the fourth photodetector 21. In the meanwhile, the second diffraction region 16 diffracts the light beam 10 in the X direction (shown in FIG. 1) such that ±1st order diffracted light reach the second photodetector 19 and the third photodetector 20.

The light beam 13 of the second wavelength reflected by the optical information recording medium 12 is diffracted by the first diffraction region 15 of the hologram element 17 in the X direction (shown in FIG. 1) such that ±1st order diffracted light reach the first photodetector 18 and the sixth photodetector 23. In the meanwhile, the second diffraction region 16 diffracts the light beam 13 in the X direction (shown in FIG. 1) such that ±1st order diffracted light reach the second photodetector 19 and the fifth photodetector 22.

Focus/tracking error signals are detected from the light beams 10 and 13 guided to the first to sixth photodetectors 18 to 23. The detected signals are used to perform recording on/reproduction from the first optical information recording medium 9 or the second optical information recording medium 12.

Next, a method for detecting focus/tracking error signals from the light beam 10 of the first wavelength and the light beam 13 of the second wavelength is described.

As shown in FIG. 2(b), the first photodetector 18 to the sixth photodetector 23 are each divided into four light receiving regions in the Y direction.

Beam spots 10a to 10d, 11a to 11d, 12a to 12d, and 13a to 13d formed by the light diffracted by the hologram element 17 on the photodetectors are also shown in FIG. 2(b). In the drawing, the spots expressed by dotted lines are derived from the light beam 10 of the first wavelength, and the spots expressed by solid lines are derived from the light beam 13 of the second wavelength.

In the first place, detection of a focus error signal is described.

Herein, the output signal from the light receiving regions 18a, 18d, 19a and 19d is signal F1, the output signal from the light receiving regions 18b, 18c, 19b and 19c is signal F2, the output signal from the light receiving regions 20a, 20d, 21a and 21d is signal F3, the output signal from the light receiving regions 20b, 20c, 21b and 21c is signal F4, the output signal from the light receiving regions 22a, 22d, 23a and 23d is signal F5, and the output signal from the light receiving regions 22b, 22c, 23b and 23c is signal F6. Focus error signal FE is detected using a known SSD (spot size detection) method. Focus error signal FE1, which is derived from the light beam 10 of the first wavelength, is obtained by the following operation of expression (1):

$$FE1 = (F1+F4)-(F2+F3) \qquad (1)$$

Focus error signal FE2, which is derived from the light beam 13 of the second wavelength, is obtained by the following operation of expression (2):

$$FE2 = (F1+F6)-(F2+F5) \qquad (2)$$

Further, focus error signal FE3 is obtained by the following operation of expression (3) which corresponds to both the light beam 10 of the first wavelength and the light beam 13 of the second wavelength:

$$FE3=(F1+F4+F6)-(F2+F3+F5) \quad (3)$$

Next, detection of a tracking error signal is described.

Herein, the output signal from the light receiving regions 18a and 18b is signal T1, the output signal from the light receiving regions 18c and 18d is signal T2, the output signal from the light receiving regions 19a and 19b is signal T3, the output signal from the light receiving regions 19c and 19d is signal T4, the output signal from the light receiving regions 20a and 20b is signal T5, the output signal from the light receiving regions 20c and 20d is signal T6, the output signal from the light receiving regions 21a and 21b is signal T7, the output signal from the light receiving regions 21c and 21d is signal T8, the output signal from the light receiving regions 22a and 22b is signal T9, the output signal from the light receiving regions 22c and 22d is signal T10, the output signal from the light receiving regions 23a and 23b is signal T11, and the output signal from the light receiving regions 23c and 23d is signal T12. Tracking error signal TE is detected using a known DPD (differential phase detection) method and PP (push pull) method.

Tracking error signal TE(DPD)1, which is derived from the light beam 10 of the first wavelength using the DPD method, is obtained by the following operation of expression (4):

$$TE(DPD)1=(T1+T4+T5+T8)-(T2+T3+T6+T7) \quad (4)$$

Tracking error signal TE(PP)1, which is derived from the light beam 10 of the first wavelength using the PP method, is obtained by the following operation of expression (5):

$$TE(PP)1=(T1+T2+T7+T8)-(T3+T4+T5+T6) \quad (5)$$

Tracking error signal TE(DPD)2, which is derived from the light beam 13 of the second wavelength using the DPD method, is obtained by the following operation of expression (6):

$$TE(DPD)2=(T1+T4+T9+T12)-(T2+T3+T10+T11) \quad (6)$$

Tracking error signal TE(PP)2, which is derived from the light beam 13 of the second wavelength using the PP method, is obtained by the following operation of expression (7):

$$TE(PP)2=(T1+T2+T11+T12)-(T3+T4+T9+T10) \quad (7)$$

Tracking error signal TE(DPD)3 is obtained by the following operation of expression (8), which corresponds to both the light beam 10 of the first wavelength and the light beam 13 of the second wavelength, using the DPD method:

$$TE(DPD)3=(T1+T4+T5+T8+T9+T12)-(T2+T3+T6+T7+T10+T11) \quad (8)$$

Tracking error signal TE(PP)3 is obtained by the following operation of expression (9), which corresponds to both the light beam 10 of the first wavelength and the light beam 13 of the second wavelength, using the PP method:

$$TE(PP)3=(T1+T2+T7+T8+T11+T12)-(T3+T4+T5+T6+T9+T10) \quad (9)$$

According to embodiment 1, the photodetectors are provided on an extended line of the line between the light emission positions of the semiconductor lasers such that, when viewed from the position of the first semiconductor laser 11, the number of photodetectors provided behind the second semiconductor laser 14 is greater than that of the photodetectors provided at the opposite side.

With such an arrangement, the diffracted light derived from the light beam 10 of the first wavelength and the diffracted light derived from the light beam 13 of the second wavelength are collected at common spot positions at least at one side of the semiconductor lasers. Thus, the number of photodetectors can be decreased. The inverse relationship as to the number of the photodetectors does not hold so long as the interval between the emission points of the semiconductor lasers is finite. At the side where there is a larger number of photodetectors, the diffracted light derived from the light beams of different wavelengths are collected at different positions. In embodiment 1, a sufficient light receiving region is secured accordingly, and therefore, the diffracted light is used efficiently.

Thus, it is possible to detect focus/tracking error signals such that stable recording and reproduction are realized with the light beam 10 of the first wavelength and the light beam 13 of the second wavelength.

As described with expressions (3), (8) and (9), the operation processes for the focus/tracking error signals can be integrated. Further, since ±1st order diffracted light of the light beam 10 of the first wavelength and the light beam 13 of the second wavelength, which are generated by the hologram element 17, are used for both the focus/tracking error signals, it is possible to improve the light use efficiency.

Embodiment 2

Figure 3:
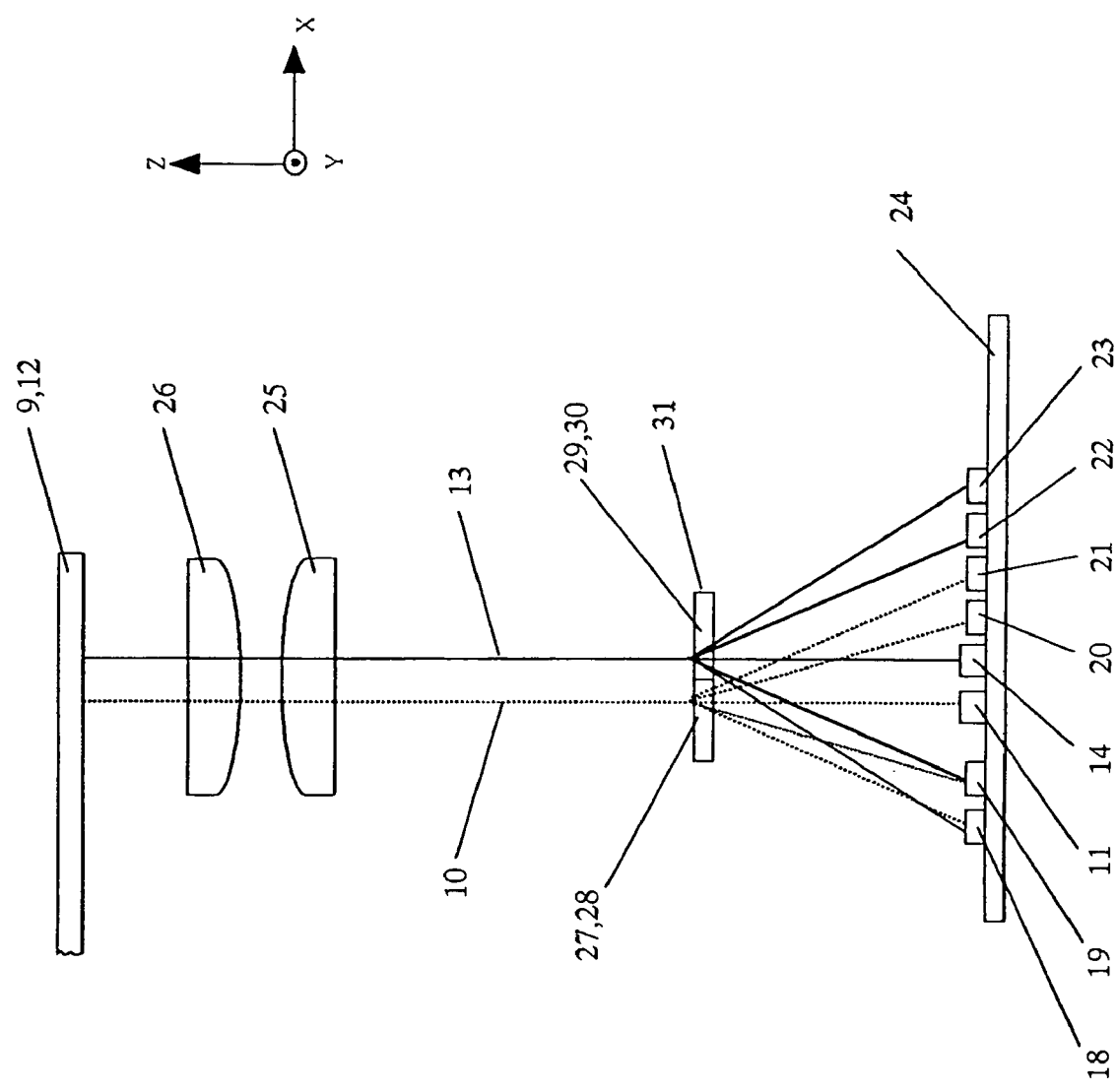
FIG. 3 is a schematic cross-sectional view of an optical device according to embodiment 2 of the present invention.

FIG. 3 schematically shows a structure of an optical device according to embodiment 2 of the present invention. FIGS. 4(a) and 4(b) are plan views respectively showing a structure of a hologram element and a structure of photodetectors according to embodiment 2 of the present invention.

The optical device shown in FIG. 3 includes: a first semiconductor laser 11 for emitting a light beam 10 which has a first wavelength corresponding to recording/reproduction of a first optical information recording medium 9; a second semiconductor laser 14 for emitting a light beam 13 which has a second wavelength corresponding to recording/reproduction of a second optical information recording medium 12; a hologram element 31 which has a first diffraction region 27, a second diffraction region 28, a third diffraction region 29 and a fourth diffraction region 30 for diffracting the light beam 10 of the first wavelength and the light beam 13 of the second wavelength; and a first photodetector 18, a second photodetector 19, a third photodetector 20, a fourth photodetector 21, a fifth photodetector 22 and a sixth photodetector 23 for receiving diffracted light from the hologram element 31, which are provided on the same integrated substrate 24. The optical device of FIG. 3 further includes a collimator lens 25 and an objective lens 26 between the hologram element 31 and the optical information recording medium 9 or 12.

The plan view of FIG. 4(b) shows an apparent emission point L1 of the first semiconductor laser 11 and an apparent emission point L2 of the second semiconductor laser 14.

Next, an operation of the optical device of embodiment 2 is described.

At the first step, optical information recording medium determination means (not shown) determines which of the first optical information recording medium 9 and the second optical information recording medium 12 is to be used. If it is the first optical information recording medium 9, the first semiconductor laser 11 of the first wavelength is driven. If it is the second optical information recording medium 12, the second semiconductor laser 14 of the second wavelength is driven. The light beam 10 emitted by the semiconductor laser 11 (dotted line in FIG. 3) or the light beam 13 emitted by the semiconductor laser 14 (solid line in FIG. 3) passes through the collimator lens 25 and the objective lens 26 to be collected on and reflected by the optical information recording medium 9 or 12. The reflected light again passes through the objective lens 26 and the collimator lens 25 to enter the hologram element (light beam branching means) 31.

The light beam 10 of the first wavelength reflected by the optical information recording medium 9 is diffracted by the first diffraction region 27 and the second diffraction region 28 of the hologram element 31 in the X direction (shown in FIG. 3) and in the Y direction with a considerably small diffraction as compared with the diffraction in the X direction such that ±1st order diffracted light reach the first photodetector 18 and the fourth photodetector 21. In the meanwhile, the third diffraction region 29 and fourth diffraction region 30 diffract the light beam 10 in the X direction (shown in FIG. 3) and in the Y direction with a considerably small diffraction as compared with the diffraction in the X direction such that ±1st order diffracted light reach the second photodetector 19 and the third photodetector 20.

The light beam 13 of the second wavelength reflected by the optical information recording medium 12 is diffracted by the first diffraction region 27 and the second diffraction region 28 of the hologram element 31 in the X direction (shown in FIG. 3) and in the Y direction with a considerably small diffraction as compared with the diffraction in the X direction such that ±1st order diffracted light reach the first photodetector 18 and the sixth photodetector 23. In the meanwhile, the third diffraction region 29 and fourth diffraction region 30 diffract the light beam 10 in the X direction (shown in FIG. 3) and in the Y direction with a considerably small diffraction as compared with the diffraction in the X direction such that ±1st order diffracted light reach the second photodetector 19 and the fifth photodetector 22.

Focus/tracking error signals are detected from the light beams 10 and 13 guided to the first to sixth photodetectors 18 to 23. The detected signals are used to perform recording on/reproduction from the first optical information recording medium 9 or the second optical information recording medium 12.

Next, a method for detecting focus/tracking error signals from the light beam 10 of the first wavelength and the light beam 13 of the second wavelength is described.

As shown in FIG. 4(b), the first photodetector 18 to the sixth photodetector 23 are each divided in the Y direction.

Beam spots 10e to 101, 11e to 111, 12e to 121, and 13e to 131 formed by the light diffracted by the hologram element 31 on the photodetectors are also shown in FIG. 4(b). In the drawing, the spots expressed by dotted lines are derived from the light beam 10 of the first wavelength, and the spots expressed by solid lines are derived from the light beam 13 of the second wavelength.

In the first place, detection of a focus error signal is described.

Herein, the output signal from the light receiving regions 18a, 18d, 19a and 19d is signal F1, the output signal from the light receiving regions 18b, 18c, 19b and 19c is signal F2, the output signal from the light receiving regions 20a, 20d, 21a and 21d is signal F3, the output signal from the light receiving regions 20b, 20c, 21b and 21c is signal F4, the output signal from the light receiving regions 22a, 22d, 23a and 23d is signal F5, and the output signal from the light receiving regions 22b, 22c, 23b and 23c is signal F6. Focus error signal FE is detected using a known SSD (spot size detection) method. Focus error signal FE1, which is derived from the light beam 10 of the first wavelength, is obtained by the operation of expression (1) as described in embodiment 1.

Focus error signal FE2, which is derived from the light beam 13 of the second wavelength, is obtained by the operation of expression (2) as described in embodiment 1.

Further, focus error signal FE3 is obtained by the operation of expression (3), which corresponds to both the light beam 10 of the first wavelength and the light beam 13 of the second wavelength, as described in embodiment 1.

Next, detection of a tracking error signal is described.

Herein, the output signal from the light receiving regions 18a and 18b is signal T1, the output signal from the light receiving regions 18c and 18d is signal T2, the output signal from the light receiving regions 19a and 19b is signal T3, the output signal from the light receiving regions 19c and 19d is signal T4, the output signal from the light receiving regions 20a and 20b is signal T5, the output signal from the light receiving regions 20c and 20d is signal T6, the output signal from the light receiving regions 21a and 21b is signal T7, the output signal from the light receiving regions 21c and 21d is signal T8, the output signal from the light receiving regions 22a and 22b is signal T9, the output signal from the light receiving regions 22c and 22d is signal T10, the output signal from the light receiving regions 23a and 23b is signal T11, and the output signal from the light receiving regions 23c and 23d is signal T12. Tracking error signal TE is detected using a known DPD (differential phase detection) method and PP (push pull) method. Tracking error signal TE(DPD)1, which is derived from the light beam 10 of the first wavelength using the DPD method, is obtained by the operation of expression (4) as described in embodiment 1.

Tracking error signal TE(PP)1, which is derived from the light beam 10 of the first wavelength using the PP method, is obtained by the operation of expression (5) as described in embodiment 1.

Tracking error signal TE(DPD)2, which is derived from the light beam 13 of the second wavelength using the DPD method, is obtained by the operation of expression (6) as described in embodiment 1.

Tracking error signal TE(PP)2, which is derived from the light beam 13 of the second wavelength using the PP method, is obtained by the operation of expression (7) as described in embodiment 1.

Tracking error signal TE(DPD)3 is obtained as described in embodiment 1 by the operation of expression (8), which corresponds to both the light beam 10 of the first wavelength and the light beam 13 of the second wavelength, using the DPD method.

Tracking error signal TE(PP)3 is obtained as described in embodiment 1 by the operation of expression (9), which corresponds to both the light beam 10 of the first wavelength and the light beam 13 of the second wavelength, using the PP method.

According to embodiment 2, even diffracted light collected at different positions because of different wavelengths are effectively used as described in embodiment 1. Thus, it is possible to detect focus/tracking error signals such that stable recording and reproduction are realized with the light beam 10 of the first wavelength and the light beam 13 of the second wavelength. Further, the operation processes for the focus/tracking error signals can be integrated by using expressions (3), (8) and (9).

Furthermore, since ±1st order diffracted light of the light beam 10 of the first wavelength and the light beam 13 of the second wavelength, which are generated by the hologram element 31, are used for both the focus/tracking error signals, it is possible to improve the light use efficiency.

Further still, the light receiving spots are divided in the Y direction (shown in FIG. 4). As a result, an assemblage margin in the Y direction (the objective lens 26, the collimator lens 25 and the hologram element 31) can be secured. Thus, it is possible to obtain a stable tracking error signal.

Embodiment 3

Figure 5:
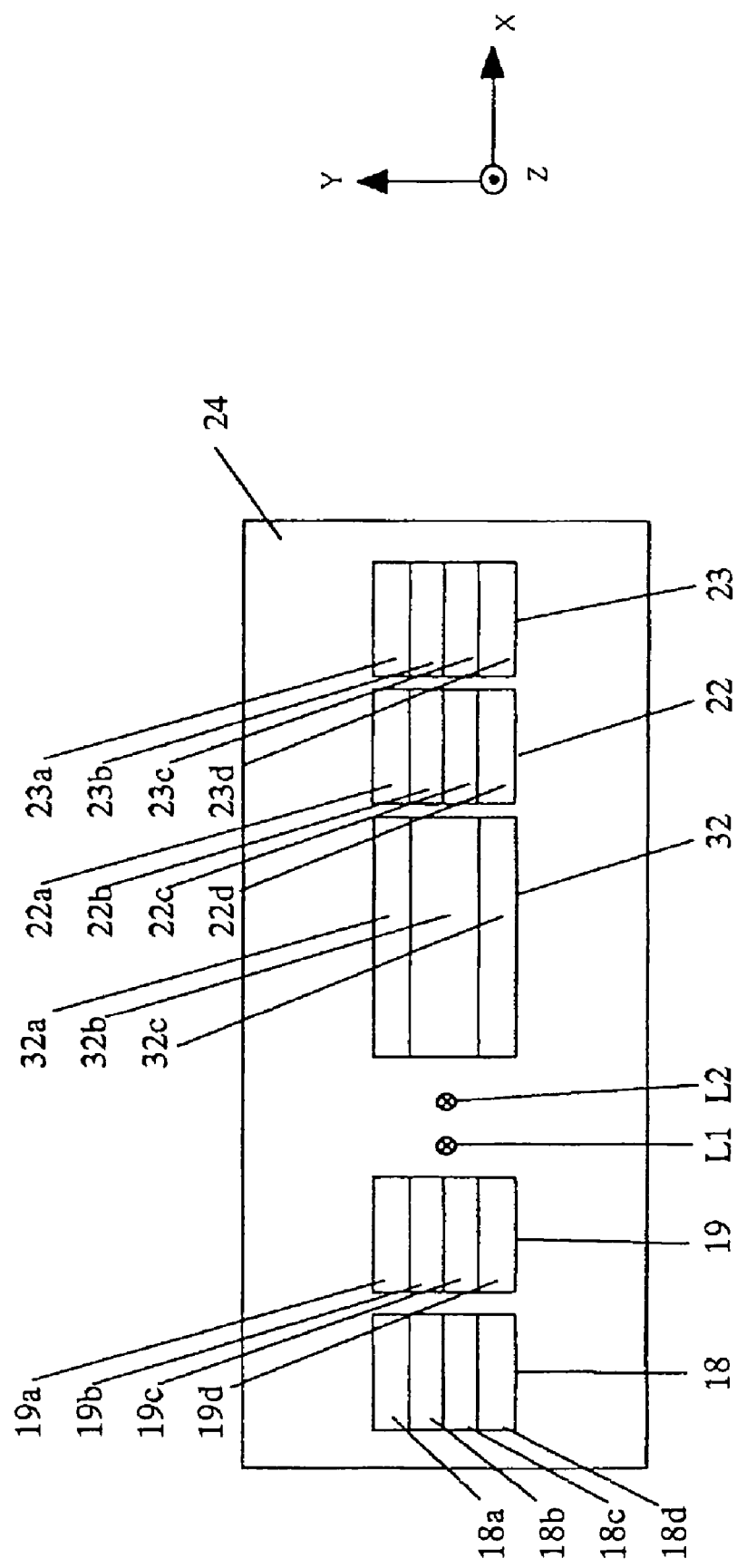
FIG. 5 is a plan view showing a structure of photodetectors according to embodiment 3 of the present invention.

FIG. 5 is a plan view showing a structure of photodetectors according to embodiment 3 of the present invention.

Figure 2:
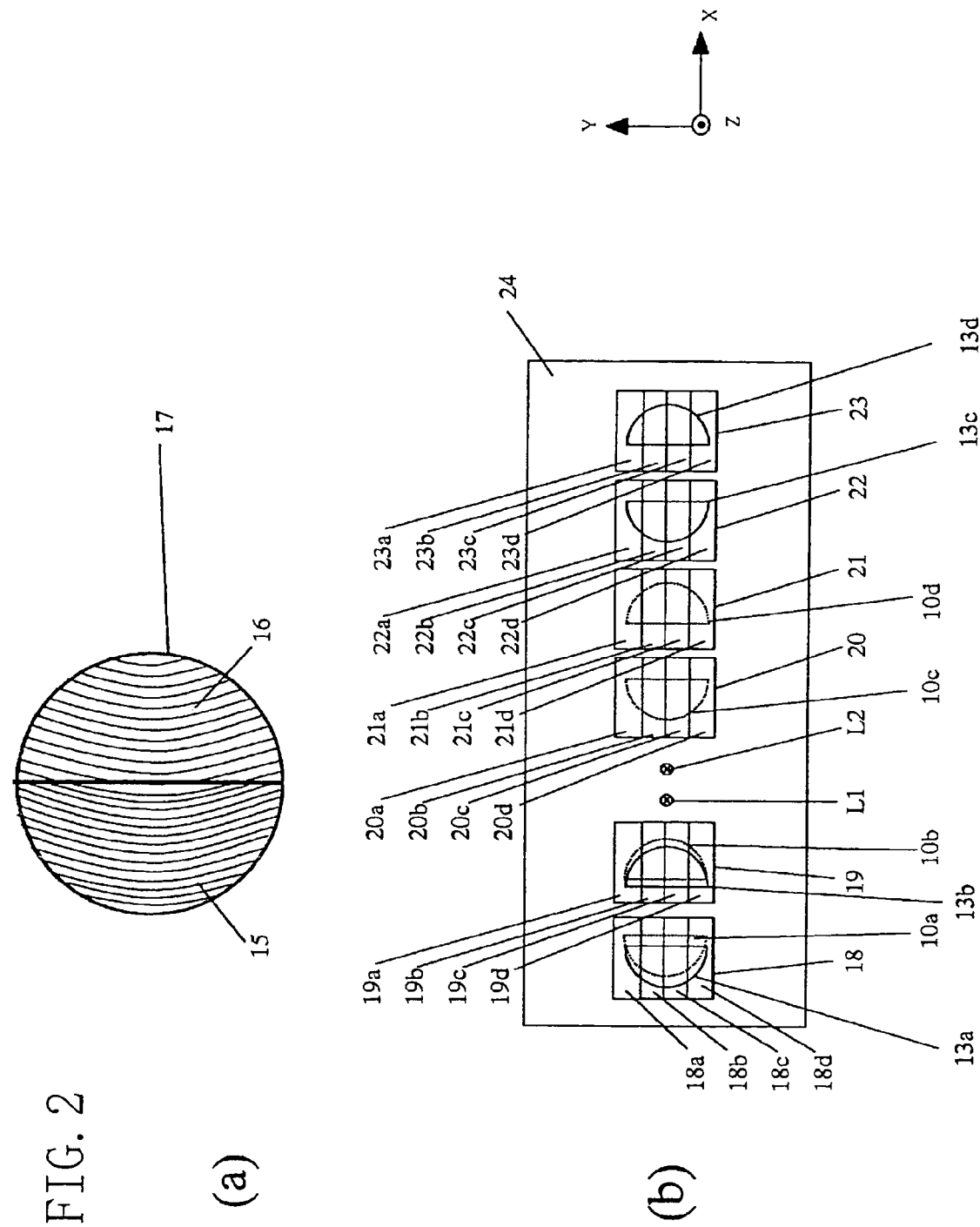
FIG. 2 schematically shows a structure of components of the optical device according to embodiment 1 of the present invention.

In the structure shown in FIG. 5, a photodetector 32 corresponds to an element obtained by integrating the photodetectors 20 and 21 of FIG. 2(*b*) or FIG. 4(*b*) into a single photodetector.

The division of the photodetectors is the same as that shown in FIG. 2(*b*) or FIG. 4(*b*) except that the photodetector 32 is divided into three parts in the Y direction.

The photodetector 32 only needs to be divided into three parts in the Y direction because the photodetector 32 is used only for detection of a focus error signal.

Herein, the output signal from the light receiving regions 18*a*, 18*d*, 19*a* and 19*d* is signal F1, the output signal from the light receiving regions 18*b*, 18*c*, 19*b* and 19*c* is signal F2, the output signal from the light receiving regions 22*a*, 22*d*, 23*a* and 23*d* is signal F5, the output signal from the light receiving regions 22*b*, 22*c*, 23*b* and 23*c* is signal F6, the output signal from the light receiving regions 32*a* and 32*c* is signal F7, and the output signal from the light receiving region 32*b* is signal F8. Focus error signal FE is detected using a known SSD (spot size detection) method.

Focus error signal FE1, which is derived from the light beam 10 of the first wavelength, is obtained by the following operation of expression (10):

$$FE1=(F1+F8)-(F2+F7) \quad (10)$$

Focus error signal FE2, which is derived from the light beam 13 of the second wavelength, is obtained by the following operation of expression (11):

$$FE2=(F1+F6)-(F2+F5) \quad (11)$$

Further, focus error signal FE3 is obtained by the following operation of expression (12) which corresponds to both the light beam 10 of the first wavelength and the light beam 13 of the second wavelength:

$$FE2=(F1+F6+F8)-(F2+F5+F7) \quad (12)$$

Next, detection of a tracking error signal is described.

Herein, the output signal from the light receiving regions 18*a* and 18*b* is signal T1, the output signal from the light receiving regions 18*c* and 18*d* is signal T2, the output signal from the light receiving regions 19*a* and 19*b* is signal T3, the output signal from the light receiving regions 19*c* and 19*d* is signal T4, the output signal from the light receiving regions 22*a* and 22*b* is signal T9, the output signal from the light receiving regions 22*c* and 22*d* is signal T10, the output signal from the light receiving regions 23*a* and 23*b* is signal T11, and the output signal from the light receiving regions 23*c* and 23*d* is signal T12. Tracking error signal TE is detected using a known DPD (differential phase detection) method and PP (push pull) method.

Tracking error signal TE(DPD)1, which is derived from the light beam 10 of the first wavelength using the DPD method, is obtained by the following operation of expression (13):

$$TE(DPD)1=(T1+T4)-(T2+T3) \quad (13)$$

Tracking error signal TE(PP)1, which is derived from the light beam 10 of the first wavelength using the PP method, is obtained by the following operation of expression (14):

$$TE(PP)1=(T1+T2)-(T3+T4) \quad (14)$$

Tracking error signal TE(DPD)2, which is derived from the light beam 13 of the second wavelength using the DPD method, is obtained by the following operation of expression (15):

$$TE(DPD)2=(T1+T4+T9+T12)-(T2+T3+T10+T11) \quad (15)$$

Tracking error signal TE(PP)2, which is derived from the light beam 13 of the second wavelength using the PP method, is obtained by the following operation of expression (16):

$$TE(PP)2=(T1+T2+T11+T12)-(T3+T4+T9+T10) \quad (16)$$

Tracking error signal TE(DPD)3 is obtained by the following operation of expression (17), which corresponds to both the light beam 10 of the first wavelength and the light beam 13 of the second wavelength, using the DPD method:

$$TE(DPD)3=(T1+T4+T9+T12)-(T2+T3+T10+T11) \quad (17)$$

Tracking error signal TE(PP)3 is obtained by the following operation of expression (18), which corresponds to both the light beam 10 of the first wavelength and the light beam 13 of the second wavelength, using the PP method:

$$TE(PP)3=(T1+T2+T11+T12)-(T3+T4+T9+T10) \quad (18)$$

According to embodiment 3, even diffracted light collected at different positions because of different wavelengths are effectively used as described in embodiments 1 and 2. Thus, it is possible to detect focus/tracking error signals such that stable recording and reproduction are realized with the light beam 10 of the first wavelength and the light beam 13 of the second wavelength.

Further, the operation processes for the focus/tracking error signals can be integrated by using expressions (12), (17) and (18).

Further, since ±1st order diffracted light of the light beam 10 of the first wavelength and the light beam 13 of the second wavelength, which are generated by the hologram element 31, are used for the focus error signal, it is possible to improve the light use efficiency.

Since separation between the photodetectors is decreased, interference noise between the photodetectors is reduced, and the area occupied by the photodetectors is reduced.

In the case of the structure shown in FIG. 4, if the size of the light receiving portion is further reduced, the light beam 10 of the first wavelength which is to be received by the photodetector 21 and the light beam 13 of the second wavelength which is to be received by the photodetector 22 partially overlap each other on the integrated substrate. As a result, the light beam 10 or the light beam 13 cannot be entirely (sufficiently) received by the corresponding photodetector 21 or photodetector 22, and stable focus/tracking error signals cannot be obtained in some cases. In such cases, if the photodetector 21 for receiving the light beam 10 of the first wavelength and the photodetector 22 for receiving the light beam 13 of the second wavelength are integrated into a signal photodetector as in embodiment 3, stable signals can be obtained without loss of a received light beam.

Figure 6:
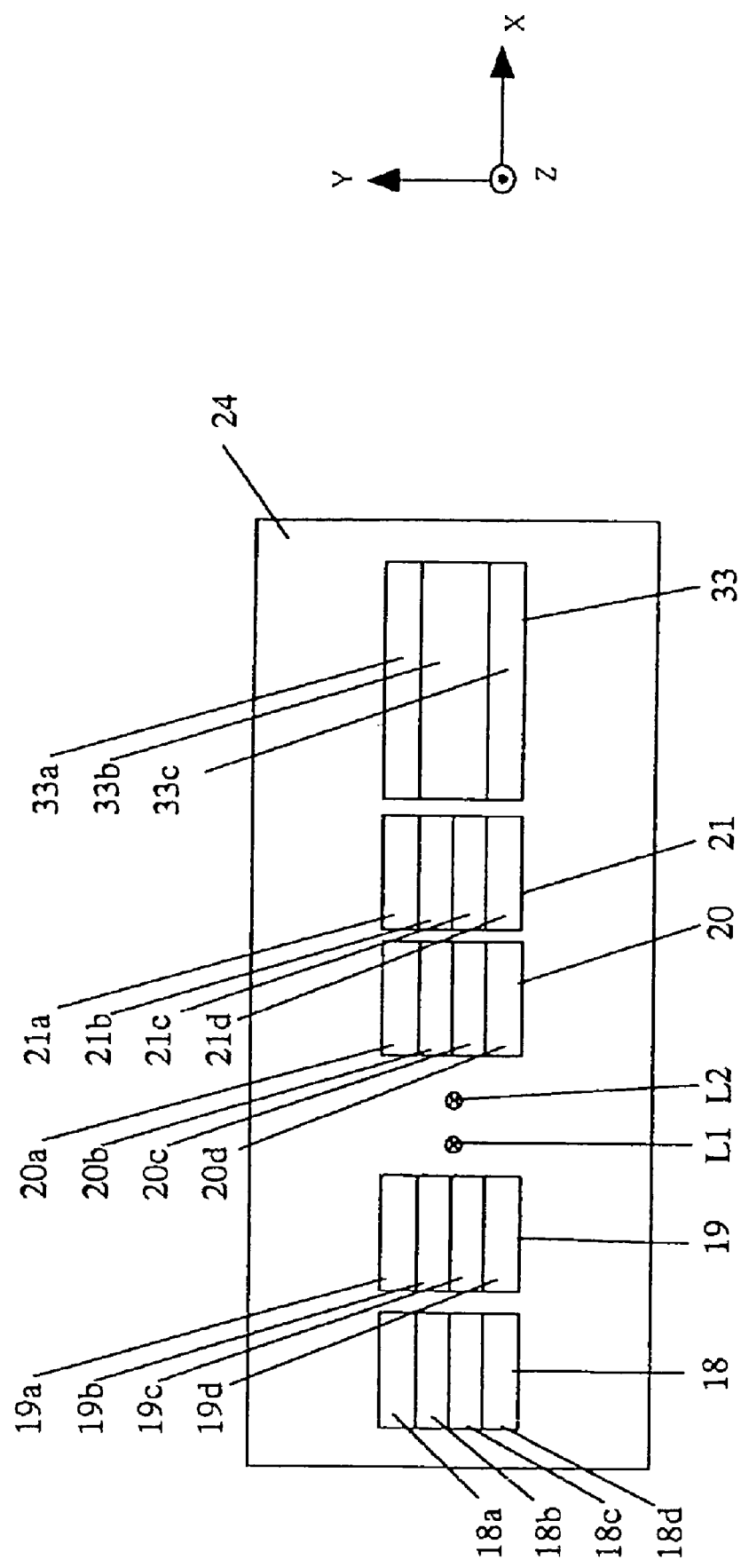
FIG. 6 is a plan view showing an alternative structure of the photodetectors according to embodiment 3 of the present invention.
Figure 7:
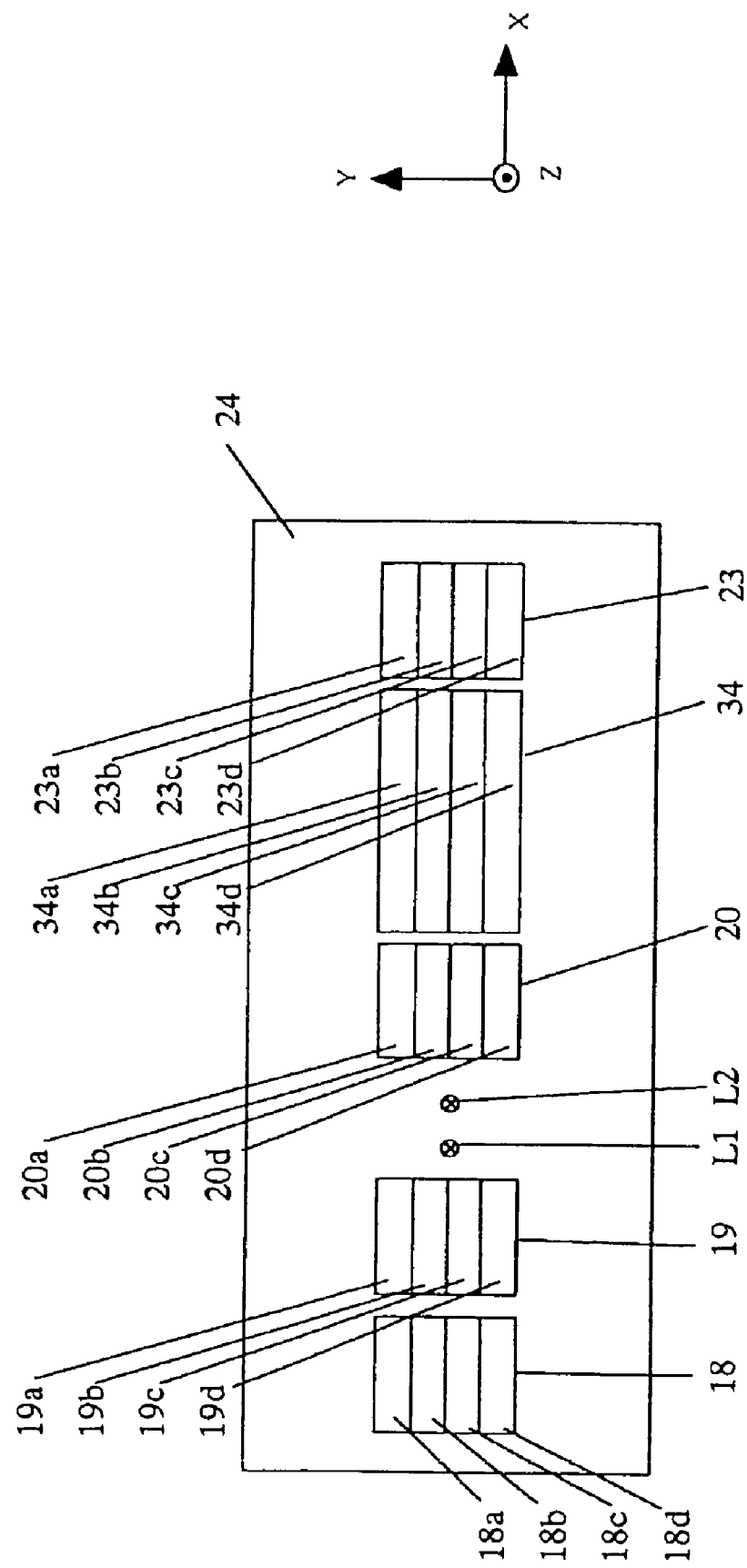
FIG. 7 is a plan view showing a structure of photodetectors according to embodiment 4 of the present invention.

FIG. 6 shows another example of the structure of the photodetectors shown in FIG. 5. Also in this case, focus/tracking error signals can be detected using a method similar to that of embodiment 3.

Embodiment 4

FIG. 6 is a plan view showing a structure of photodetectors according to embodiment 4 of the present invention.

In the structure shown in FIG. 6, a photodetector 34 corresponds to an element obtained by integrating the photodetectors 21 and 22 of FIG. 2(b) or FIG. 4(b) into a single photodetector.

The photodetector 34 is divided into four parts in the Y direction.

Next, a method for detecting focus/tracking error signals from the light beam 10 of the first wavelength and the light beam 13 of the second wavelength is described.

Herein, the output signal from the light receiving regions 18a, 18d, 19a and 19d is signal F1, the output signal from the light receiving regions 18b, 18c, 19b and 19c is signal F2, the output signal from the light receiving regions 20a and 20d is signal F3', the output signal from the light receiving regions 20b and 20c is signal F4', the output signal from the light receiving regions 23a and 23d is signal F5', the output signal from the light receiving regions 23b and 23c is signal F6', the output signal from the light receiving regions 34a and 34d is signal F9, and the output signal from the light receiving regions 34b and 34c is signal F10. Focus error signal FE is detected using a known SSD (spot size detection) method.

Focus error signal FE1, which is derived from the light beam 10 of the first wavelength, is obtained by the following operation of expression (19):

$$FE1=(F1+F4'+F10)-(F2+F3'+F9) \quad (19)$$

Focus error signal FE2, which is derived from the light beam 13 of the second wavelength, is obtained by the following operation of expression (20):

$$FE2=(F1+F6'+F10)-(F2+F5'+F9) \quad (20)$$

Further, focus error signal FE3 is obtained by the following operation of expression (21) which corresponds to both the light beam 10 of the first wavelength and the light beam 13 of the second wavelength:

$$FE3=(F1+F4'+F6'+F10)-(F2+F3'+F5'+F9) \quad (21)$$

Herein, the output signal from the light receiving regions 18a and 18b is signal T1, the output signal from the light receiving regions 18c and 18d is signal T2, the output signal from the light receiving regions 19a and 19b is signal T3, the output signal from the light receiving regions 19c and 19d is signal T4, the output signal from the light receiving regions 20a and 20b is signal T5, the output signal from the light receiving regions 20c and 20d is signal T6, the output signal from the light receiving regions 23a and 23b is signal T11, the output signal from the light receiving regions 23c and 23d is signal T12, the output signal from the light receiving regions 34a and 34b is signal T13, and the output signal from the light receiving regions 34c and 34d is signal T14. Tracking error signal TE is detected using a known DPD (differential phase detection) method and PP (push pull) method.

Tracking error signal TE(DPD)1, which is derived from the light beam 10 of the first wavelength using the DPD method, is obtained by the following operation of expression (22):

$$TE(DPD)1=(T1+T4++T5+T14)-(T2+T3+T6+T13) \quad (22)$$

Tracking error signal TE(PP)1, which is derived from the light beam 10 of the first wavelength using the PP method, is obtained by the following operation of expression (23):

$$TE(PP)1=(T1+T2+T13+T14)-(T3+T4+T5+T6) \quad (23)$$

Tracking error signal TE(DPD)2, which is derived from the light beam 13 of the second wavelength using the DPD method, is obtained by the following operation of expression (24):

$$TE(DPD)2=(T1+T4+T12+T13)-(T2+T3+T11+T14) \quad (24)$$

Tracking error signal TE(PP)2, which is derived from the light beam 13 of the second wavelength using the PP method, is obtained by the following operation of expression (25):

$$TE(PP)2=(T1+T2+T11+T12)-(T3+T4+T13+T14) \quad (25)$$

According to embodiment 4, even diffracted light collected at different positions because of different wavelengths are effectively used as described in embodiment 3. Thus, it is possible to detect focus/tracking error signals such that stable recording and reproduction are realized with the light beam 10 of the first wavelength and the light beam 13 of the second wavelength.

Further, the operation processes for the focus error signal can be integrated by using expression (21). Furthermore, since ±1st order diffracted light of the light beam 10 of the first wavelength and the light beam 13 of the second wavelength, which are generated by the hologram element 17, are used for both the focus/tracking error signals, it is possible to improve the light use efficiency.

Since separation between the photodetectors is decreased, interference noise between the photodetectors is reduced, and the area occupied by the photodetectors is reduced. The arrangement of the photodetectors of embodiment 4 is effective when separation of the photodetector 21 for receiving the light beam 10 of the first wavelength and the photodetector 22 for receiving the light beam 13 of the second wavelength is difficult.

Embodiment 5

Figure 8:
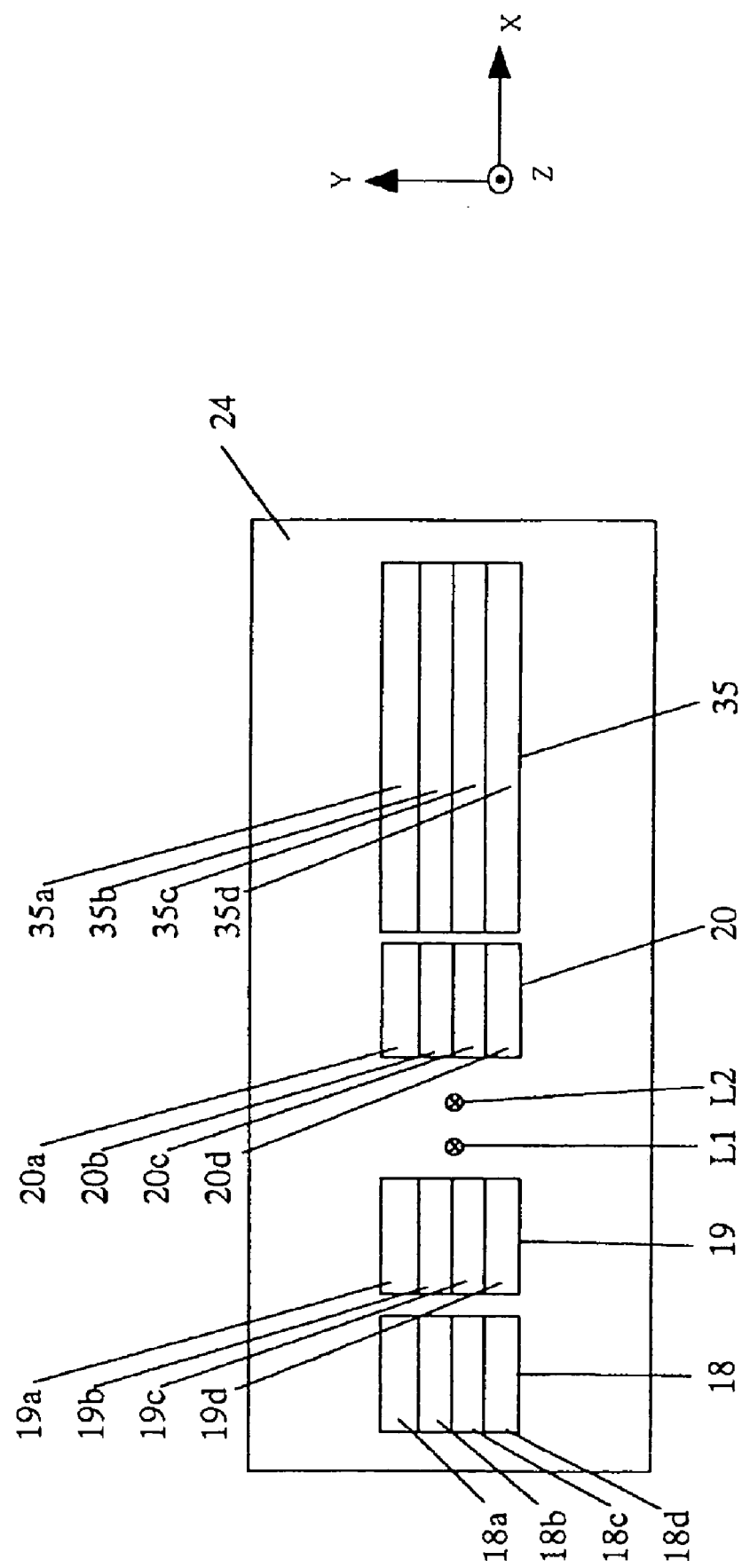
FIG. 8 is a plan view showing a structure of photodetectors according to embodiment 5 of the present invention.

FIG. 8 is a plan view showing a structure of photodetectors according to embodiment 5 of the present invention.

In the structure shown in FIG. 8, a photodetector 35 corresponds to an element obtained by integrating the photodetectors 21, 22 and 23 of FIG. 2(b) or FIG. 4(b) into a single photodetector.

The division of the photodetectors is the same as that shown in FIG. 2(b) or FIG. 4(b).

Next, a method for detecting a focus error signal from the light beam 10 of the first wavelength and the light beam 13 of the second wavelength is described.

Herein, the output signal from the light receiving regions 18a, 18d, 19a and 19d is signal F1, the output signal from the light receiving regions 18b, 18c, 19b and 19c is signal F2, the output signal from the light receiving regions 20a and 20d is signal F3', the output signal from the light receiving regions 20b and 20c is signal F4', the output signal from the light receiving regions 35a and 35d is signal F13, and the output signal from the light receiving regions 35b and 35c is signal F14. Focus error signal FE is detected using a known SSD (spot size detection) method.

Focus error signal FE1, which is derived from the light beam 10 of the first wavelength, is obtained by the following operation of expression (26):

$$FE1=(F1+F4'+F16)-(F2+F3'+F15) \quad (26)$$

Focus error signal FE2, which is derived from the light beam 13 of the second wavelength, is obtained by the following operation of expression (27):

$$FE2=(F1+F14)-(F2+F13) \quad (27)$$

Further, focus error signal FE3 is obtained by the following operation of expression (28) which corresponds to both the light beam 10 of the first wavelength and the light beam 13 of the second wavelength:

$$FE3=(F1+F4'+F14)-(F2+F3'+F13) \quad (28)$$

Next, detection of a tracking error signal is described.

Herein, the output signal from the light receiving regions 18a and 18b is signal T1, the output signal from the light receiving regions 18c and 18d is signal T2, the output signal from the light receiving regions 19a and 19b is signal T3, the output signal from the light receiving regions 19c and 19d is signal T4, the output signal from the light receiving regions 20a and 20b is signal T5, the output signal from the light receiving regions 20c and 20d is signal T6, the output signal from the light receiving regions 35a and 35b is signal T15, and the output signal from the light receiving regions 35c and 35d is signal T16. Tracking error signal TE is detected using a known DPD (differential phase detection) method and PP (push pull) method.

Tracking error signal TE(DPD)1, which is derived from the light beam 10 of the first wavelength using the DPD method, is obtained by the following operation of expression (29):

$$TE(DPD)=(T1+T4+T5+T16)-(T2+T3+T6+T15) \quad (29)$$

Tracking error signal TE(PP)1, which is derived from the light beam 10 of the first wavelength using the PP method, is obtained by the following operation of expression (30):

$$TE(PP)1=(T1+T2+T15+T16)-(T3+T4+T5+T6) \quad (30)$$

Tracking error signal TE(DPD)2, which is derived from the light beam 13 of the second wavelength using the DPD method, is obtained by the following operation of expression (31):

$$TE(DPD)2=(T1+T4)-(T2+T3) \quad (31)$$

Tracking error signal TE(PP)2, which is derived from the light beam 13 of the second wavelength using the PP method, is obtained by the following operation of expression (32):

$$TE(PP)2=(T1+T2)-(T3+T4) \quad (32)$$

According to embodiment 5, the photodetectors are provided on an extended line of the line between the light emission positions of the semiconductor lasers. At least one of the photodetectors provided behind the second semiconductor laser 14, when viewed from the position of the first semiconductor laser 11, has a greater dimension in the direction of the extended line than that of the other photodetector provided at the same side.

At the side behind the second semiconductor laser 14 when viewed from the position of the first semiconductor laser 11, diffracted light derived from light beams of different wavelengths are collected at different positions as described in embodiment 1. In the structure of embodiment 5, a sufficient light receiving region is secured also in this side, and therefore, the diffracted light is used efficiently.

Thus, it is possible to detect focus/tracking error signals such that stable recording and reproduction are realized with the light beam 10 of the first wavelength and the light beam 13 of the second wavelength. Further, the operation processes for the focus error signal can be integrated by using expression (37). Furthermore, since ±1st order diffracted light of the light beam 10 of the first wavelength and the light beam 13 of the second wavelength, which are generated by the hologram element 17, are used for the focus error signal, it is possible to improve the light use efficiency.

Since separation between the photodetectors is decreased, interference noise between the photodetectors is reduced, and the area occupied by the photodetectors is reduced. The arrangement of the photodetectors of embodiment 5 is effective when separation of the photodetector 21 for receiving the light beam 10 of the first wavelength and the photodetector 22 for receiving the light beam 13 of the second wavelength is difficult.

Figure 9:
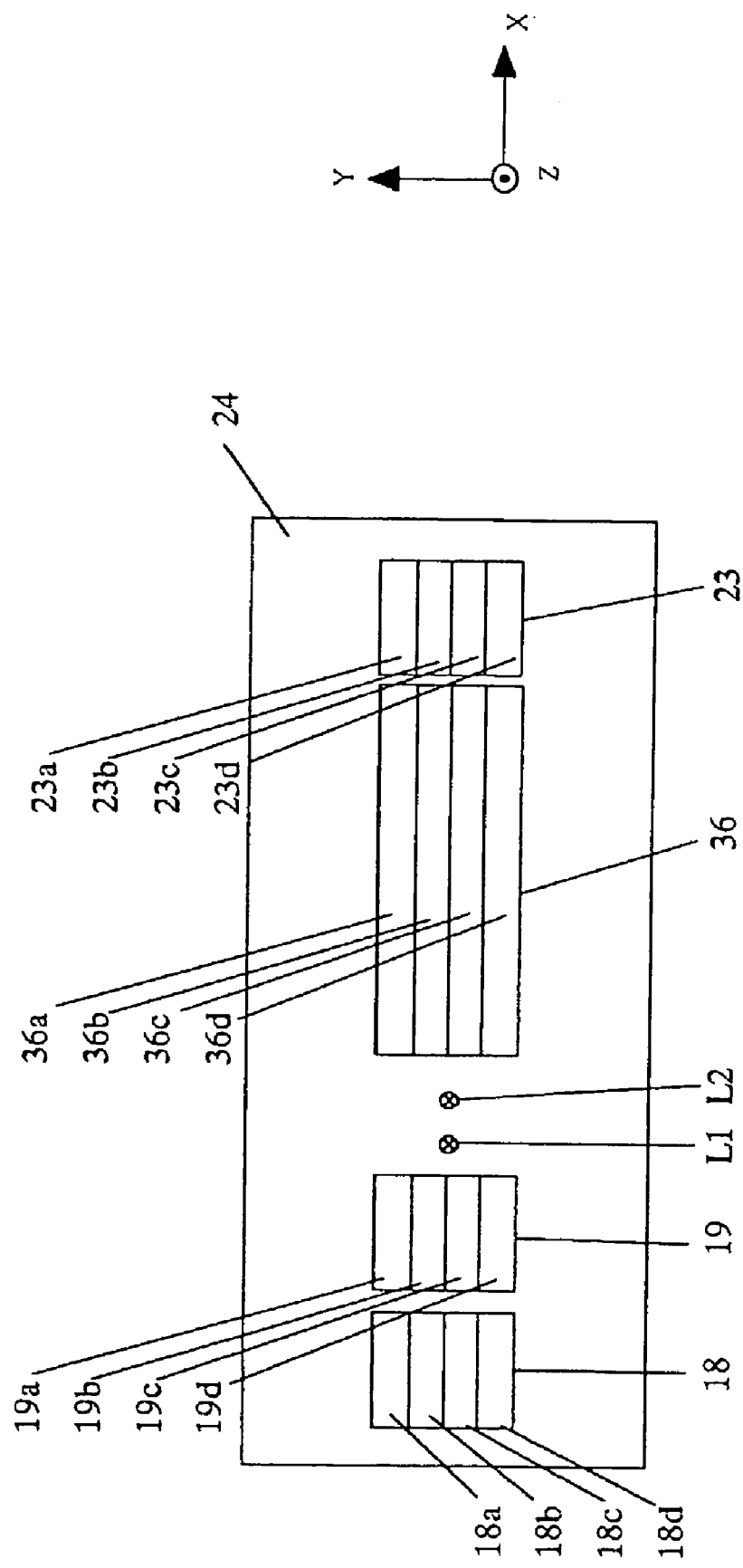
FIG. 9 is a plan view showing an alternative structure of the photodetectors according to embodiment 5 of the present invention.

FIG. 9 shows another example of the structure of the photodetectors shown in FIG. 8. Also in this case, focus/tracking error signals can be detected using the method of embodiment 5.

Embodiment 6

An optical device of embodiment 6 includes a diffraction grating for generating three beams in addition to the components of the optical device of embodiment 1 of the present invention.

Figure 10:
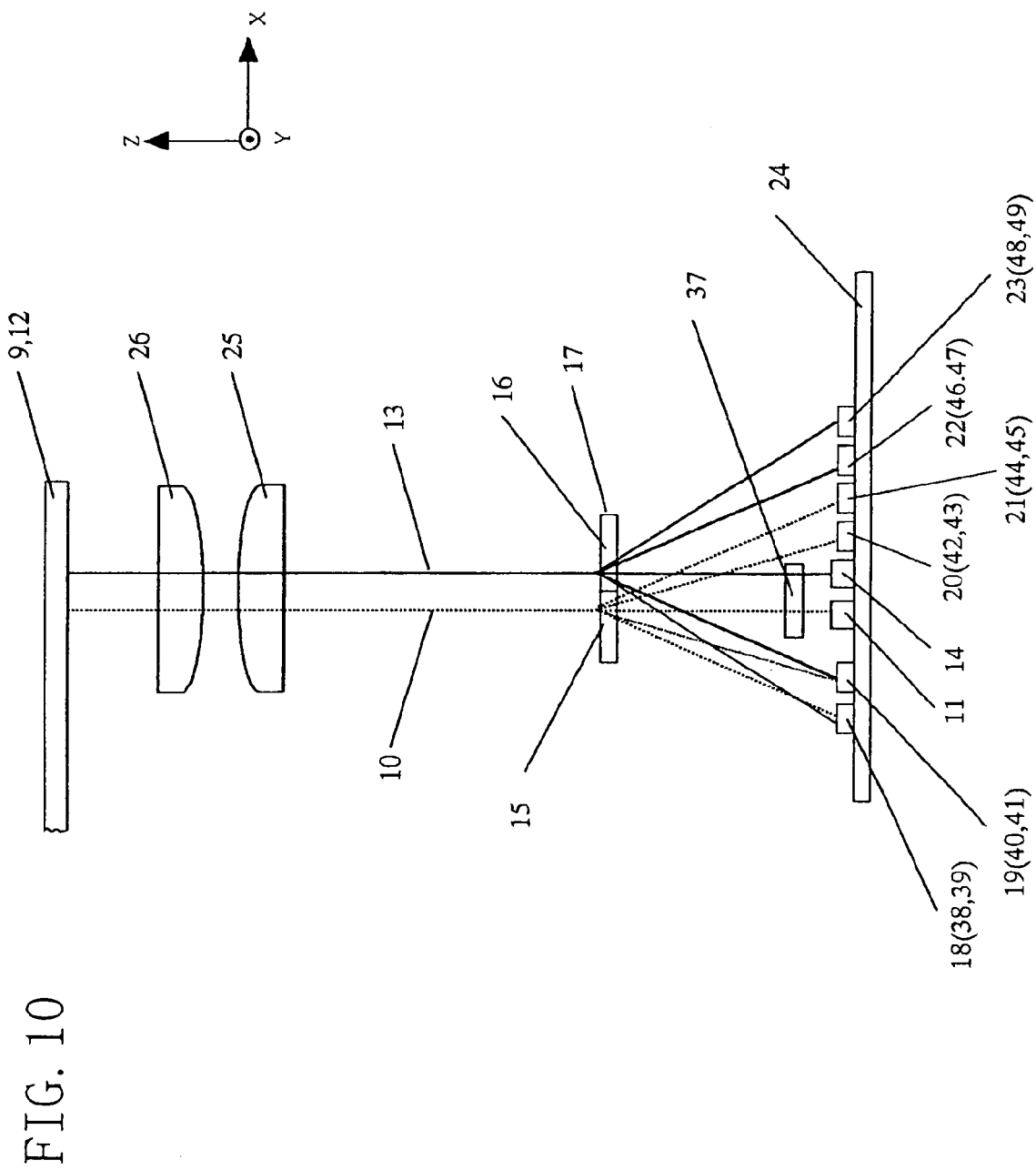
FIG. 10 is a schematic cross-sectional view of an optical device including a diffraction grating for generation of three beams according to embodiment 6 of the present invention.
Figure 11:
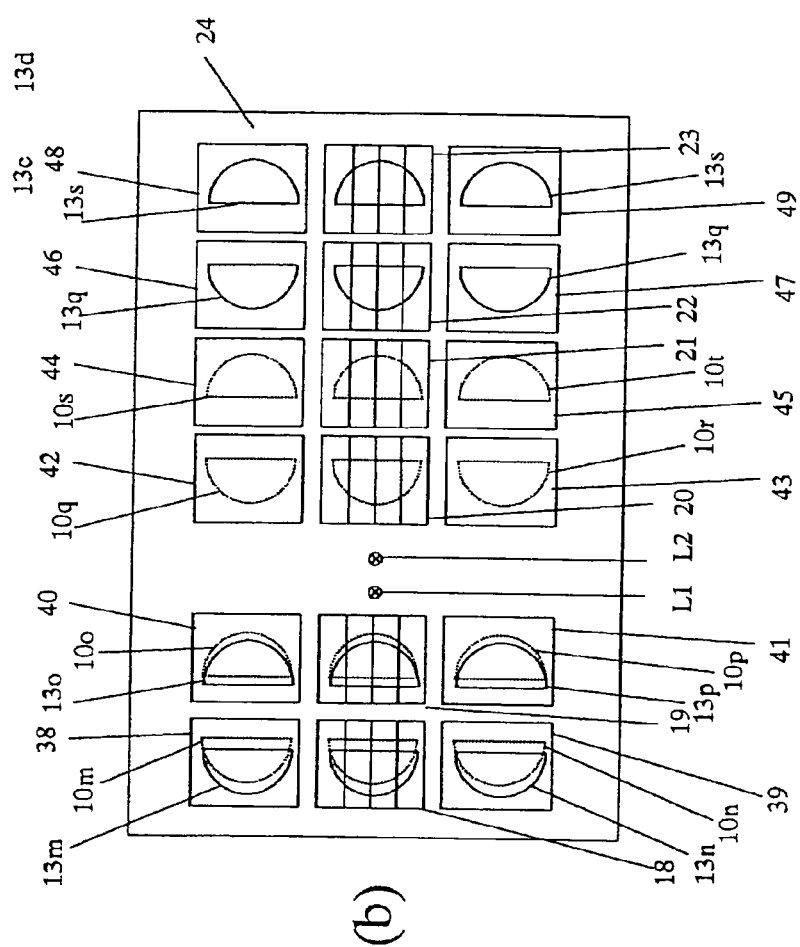
FIG. 11 schematically shows a structure of components of the optical device according to embodiment 6 of the present invention.
Figure 12:
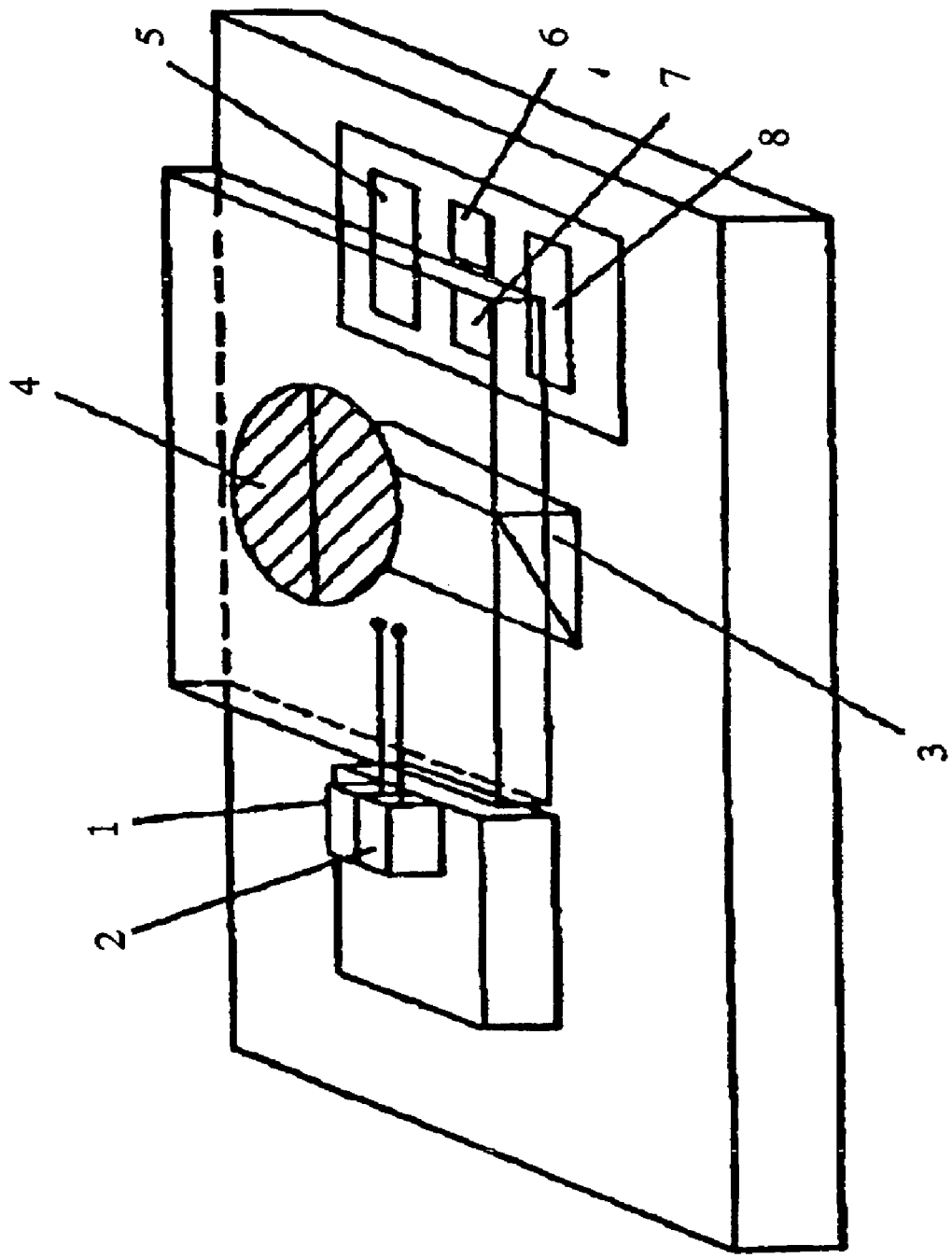
FIG. 12 is a schematic cross-sectional view of a conventional optical device.

FIG. 10 schematically shows a structure of the optical device according to embodiment 6 of the present invention. FIGS. 11(a) and 11(b) are plan views respectively showing a structure of a hologram element and a structure of photodetectors according to embodiment 6 of the present invention.

The optical device of embodiment 6 includes a diffraction grating 37 for generating three beams between the first semiconductor laser 11 and second semiconductor laser 14 and the hologram element 17.

Next, the optical paths of sub-beams in the optical device of embodiment 6 are described. At the first step, optical information recording medium determination means (not shown) determines which of the first optical information recording medium 9 and the second optical information recording medium 12 is to be used. If it is the first optical information recording medium 9, the first semiconductor laser 11 of the first wavelength is driven. If it is the second optical information recording medium 12, the second semiconductor laser 14 of the second wavelength is driven.

The light beam 10 emitted by the semiconductor laser 11 (dotted line in FIG. 10) or the light beam 13 emitted by the semiconductor laser 14 (solid line in FIG. 10) is divided by the diffraction grating 37 for three-beam generation into a 0th order main beam and ±1st order sub-beams (not shown). The beams pass through the collimator lens 25 and the objective lens 26 to be collected on and reflected by the optical information recording medium 9 or 12. The reflected light again passes through the objective lens 26 and the collimator lens 25 to enter the hologram element (light beam branching means) 17.

The 0th order main beam of the light beam 10 of the first wavelength reflected by the optical information recording medium 9 is diffracted by the first diffraction region 15 of the hologram element 17 in the X direction (shown in FIG. 10) such that ±1st order diffracted light reach the photodetectors 18 and 21. In the meanwhile, the second diffraction region 16 diffracts the 0th order main beam of the light beam 10 in the X direction (shown in FIG. 10) such that ±1st order diffracted light reach the second photodetectors 19 and 20.

The 0th order main beam of the light beam 13 of the second wavelength reflected by the optical information recording medium 12 is diffracted by the first diffraction region 15 of the hologram element 17 in the X direction (shown in FIG. 10) such that ±1st order diffracted light reach the photodetectors 18 and 23. In the meanwhile, the second diffraction region 16 diffracts the 0th order main beam of the light beam 13 in the X direction (shown in FIG. 10) such that l1st order diffracted light reach the second photodetectors 19 and 22.

The ±1st order sub-beams of the light beam 10 of the first wavelength reflected by the optical information recording medium 9 are diffracted by the first diffraction region 15 of the hologram element 17 in the X direction (shown in FIG. 10) such that ±1st order diffracted light reach sub-photodetectors 38, 39, 44 and 45. In the meanwhile, the second diffraction region 16 diffracts the ±1st order sub-beams of the light beam 10 in the X direction (shown in FIG. 10) such that ±1st order diffracted light reach sub-photodetectors 40, 41, 42 and 43.

The ±1st order sub-beams of the light beam 13 of the second wavelength reflected by the optical information recording medium 12 are diffracted by the first diffraction region 15 of the hologram element 17 in the X direction (shown in FIG. 10) such that ±1st order diffracted light reach sub-photodetectors 38, 39, 48 and 49. In the meanwhile, the second diffraction region 16 diffracts the ±1st order sub-beams of the light beam 13 in the X direction (shown in FIG. 10) such that ±1st order diffracted light reach sub-photodetectors 40, 41, 46 and 47.

A tracking error signal is detected from the light beams 10 and 13 guided to the sub-photodetectors 38 to 49. The detected signal is used to perform recording on/reproduction from the first optical information recording medium 9 or the second optical information recording medium 12.

Beam spots $10n$ to $10t$, $11n$ to $11t$, $12n$ to $12t$, and $13n$ to $13t$ formed by the light diffracted by the hologram element 17 on the sub-photodetectors are also shown in FIG. 11(b). In the drawing, the spots expressed by dotted lines are derived from the light beam 10 of the first wavelength, and the spots expressed by solid lines are derived from the light beam 13 of the second wavelength.

Next, a method for detecting a tracking error signal using the sub-beams derived from the light beam 10 of the first wavelength and the light beam 13 of the second wavelength is described.

Herein, the output signal from the sub-photodetector 38 is signal ST1, the output signal from the sub-photodetector 39 is signal ST2, the output signal from the sub-photodetector 40 is signal ST3, the output signal from the sub-photodetector 41 is signal ST4, the output signal from the sub-photodetector 42 is signal ST5, the output signal from the sub-photodetector 43 is signal ST6, the output signal from the sub-photodetector 44 is signal ST7, the output signal from the sub-photodetector 45 is signal ST8, the output signal from the sub-photodetector 46 is signal ST9, the output signal from the sub-photodetector 47 is signal ST10, the output signal from the sub-photodetector 48 is signal ST11, and the output signal from the sub-photodetector 49 is signal ST12. Based on these signals, a tracking error signal can be obtained using a known three beam method.

Tracking error signal TE(3B)1, which is derived from the light beam 10 of the first wavelength using the three beam method, is obtained by the following operation of expression (33):

$$TE(3B)1=(ST1+ST3+ST5+ST7)-(ST2+ST4+ST6+ST8) \qquad (33)$$

Tracking error signal TE(3B)2, which is derived from the light beam 13 of the second wavelength using the three beam method, is obtained by the following operation of expression (34):

$$TE(3B)2=(ST1+ST3+ST9+ST11)-(ST2+ST4+ST10+ST12) \qquad (34)$$

Tracking error signal TE(3B)3 is obtained by the following operation of expression (35) which corresponds to both the light beam 10 of the first wavelength and the light beam 13 of the second wavelength:

$$TE(3B)3=(ST1+ST3+ST5+ST7+ST9+ST11)-(ST2+ST4+ST6+ST8+ST10+ST12) \qquad (35)$$

Next, the operation for a tracking error signal TE(SPP) using a sub push pull method is described.

Tracking error signal TE(SPP)1, which is derived from the light beam 10 of the first wavelength using the sub push pull method, is obtained by the following operation of expression (36):

$$TE(SPP)1=(ST1+ST2+ST7+ST8)-(ST3+ST4+ST5+ST6) \qquad (36)$$

Tracking error signal TE(SPP)2, which is derived from the light beam 13 of the second wavelength using the sub push pull method, is obtained by the following operation of expression (37):

$$TE(SPP)2=(ST1+ST2+ST11+ST12)-(ST3+ST4+ST9+ST10) \qquad (37)$$

Tracking error signal TE(SPP)3 is obtained by the following operation of expression (38) which corresponds to both the light beam 10 of the first wavelength and the light beam 13 of the second wavelength:

$$TE(SPP)3=(ST1+ST2+ST7+ST8+ST11+ST12)-(ST3+ST4+ST5+ST6+ST9+ST1) \qquad (38)$$

Combination of the tracking error signal detection methods, i.e., the sub push pull method described in embodiment 6 and the PP method described in embodiment 1, realizes detection of a tracking error signal with a three beam push pull method which is more stable than the PP method.

Next, the operation based on the three beam push pull method is described.

Tracking error signal TE(3BPP)1, which is derived from the light beam 10 of the first wavelength using the three beam push pull method, is obtained by the following operation of expression (39):

$$TE(3BPP)1=TE(PP)1-k\times TE(SPP)1 \qquad (39)$$

Tracking error signal TE(3BPP)2, which is derived from the light beam 13 of the second wavelength using the three beam push pull method, is obtained by the following operation of expression (40):

$$TE(3BPP)2=TE(PP)2-k\times TE(SPP)2 \qquad (40)$$

Tracking error signal TE(3BPP)3 is obtained by the following operation of expression (41) which corresponds to both the light beam 10 of the first wavelength and the light beam 13 of the second wavelength:

$$TE(3BPP)3 = TE(PP)3 - k \times TE(SPP)3 \quad (41)$$

In expressions (39), (40) and (41), k is an arbitrary number.

Using the diffraction grating for three beam generation enables detection of a tracking error signal based on the three beam method or three beam push pull method. The optical device can operate with a larger variety of optical information recording media by increasing the number of types of tracking error signal detection methods of embodiment 1.

Further, also in the case of the optical devices of embodiments 2-5 of the present invention, the optical devices can operate with a larger variety of optical information recording media by adding a diffraction grating for three beam generation to increase the number of types of tracking error signal detection methods as in embodiment 6.

The optical device of embodiment 6 includes the sub-photodetectors 42 to 48. However, tracking error detection is possible even if these sub-photodetectors are omitted, although the error detection accuracy slightly decreases.

The output signal of the three beam method and the output signal of the sub push pull method can be calculated based on the combination of the output signals from the sub-photodetectors with the difference of two output signals. The two output signals can be switched by, for example, a switch, or the like, to signals respectively corresponding to the three beam method and the sub push pull method.

In embodiments 1-6, for example, the first optical information recording medium is a DVD (DVD, DVD-ROM, DVD-RAM, DVD-R, DVD-RW, or the like), and the second optical information recording medium is a CD (CD, CD-ROM, CD-R, CD-RW, or the like). For example, the first wavelength is about 650 nm, and the second wavelength is about 780 nm.

Alternatively, for example, a semiconductor laser which operates at 200 nm to 450 nm is employed for the first wavelength, and a semiconductor laser which operates at about 650 nm or about 780 nm is employed for the second wavelength.

As described above, according to the optical pickup (optical device) of the present invention, the number and shape of photodetectors are defined such that diffracted light collected at different spot positions because of different wavelengths are effectively used. Thus, the optical device of the present invention can operate with different varieties of optical information recording media and has flexibility in the location and design of the photodetectors. Therefore, the optical device of the present invention can detect focus/tracking error signals such that more stable recording and reproduction are realized.

INDUSTRIAL APPLICABILITY

According to the present invention, diffracted light collected at different spot positions because of different wavelengths are effectively used. The present invention allows use of different varieties of optical information recording media and has flexibility in the location and design of the photodetectors. Thus, the present invention practically realizes an optical pickup capable of detecting focus/tracking error signals such that more stable recording and reproduction are achieved. Because of such advantages, the industrial applicability of the present invention is wide.

The invention claimed is:

1. An optical pickup, comprising:
   a first semiconductor laser for emitting a light beam of a first wavelength;
   a second semiconductor laser for emitting a light beam of a second wavelength, the second wavelength being different from the first wavelength;
   a hologram element for diffracting reflected light generated by reflecting any one of the light beam of the first wavelength and the light beam of the second wavelength by an optical information recording medium; and
   a plurality of photodetectors for receiving the diffracted light from the hologram element,
   wherein the hologram element is divided into two or more different diffraction regions by one or more dividing lines passing through a center of the hologram element,
   the plurality of photodetectors are provided away from the first semiconductor laser and the second semiconductor laser at both sides of a laser region including the first semiconductor laser and the second semiconductor laser, at least two or more of the plurality of the photodetectors being provided respectively at one side of the both sides and at the other side of the both sides opposite to the one side along an extended line of a line between a light emission position of the first semiconductor laser and a light emission position of the second semiconductor laser,
   each of the plurality of the photodetectors provided at the one side of the both sides and at the other side of the both sides is divided into at least four regions in a direction substantially parallel to the extended line,
   the diffracted light generated from the light beam of the first wavelength by the hologram element and the diffracted light generated from the light beam of the second wavelength by the hologram element are collected at substantially the same position in an area at the one side of the both sides, part of the plurality of photodetectors being provided at the position,
   signals obtained both from the four regions of the plurality of the photodetectors provided at the one side of the both sides and from the four regions of the plurality of the photodetectors provided at the other side of the both sides are used to obtain both a focus error signal and a tracking error signal,
   the second wavelength of the light beam of the second semiconductor laser is longer than the first wavelength of the light beam of the first semiconductor laser,
   the number of the photodetectors provided at the other side is greater than that of the photodetectors provided at the one side,
   the photodetectors provided at the one side are nearer to the first semiconductor laser than the second semiconductor laser, and
   the photodetectors provided at the one side are provided away from each other.

2. The optical pickup according to claim 1, wherein at least one of the photodetectors provided at the other side has a longer dimension in the direction of the extended line than those of the photodetectors provided at the one side.

3. The optical pickup according to claim 1, wherein each of the plurality of photodetectors is separated with an interval.

4. An optical pickup, comprising:
   a first semiconductor laser for emitting a light beam of a first wavelength;

a second semiconductor laser for emitting a light beam of a second wavelength, the second wavelength being different from the first wavelength;

a diffraction grating for dividing any one of the light beam emitted by the first semiconductor laser and the light beam emitted by the second semiconductor laser into a 0th order main beam and 1st order sub-beams;

a hologram element for diffracting reflected light generated by reflecting the 0th order main beam and the 1st order sub-beams by an optical information recording medium; and a plurality of photodetectors for receiving the diffracted light from the hologram element, wherein the hologram element is divided into two or more different diffraction regions by one or more dividing lines passing through a center of the hologram element, photodetectors for receiving the diffracted light generated from the 0th order main beam by the hologram element are provided away from the first semiconductor laser and the second semiconductor laser at both sides of the first and second semiconductor lasers, at least two or more of the plurality of the photodetectors being provided respectively at one side of the both sides and at the other side of the both sides opposite to the one side along an extended line of a line between a light emission position of the first semiconductor laser and a light emission position of the second semiconductor laser, each of the plurality of the photodetectors provided at the one side of the both sides and at the other side of the both sides is divided into at least four regions in a direction substantially parallel to the extended line, the diffracted light generated from the 0th order main beam of the first wavelength by the hologram element and the diffracted light generated from the 0th order main beam of the second wavelength by the hologram element are collected at substantially the same position in an area at the one side of the both sides, the photodetectors being provided at the position, signals obtained both from the four regions of the plurality of the photodetectors provided at the one side of the both sides and from the four regions of the plurality of the photodetectors provided at the other side of the both sides are used to obtain both a focus error signal and a tracking error signal, the second wavelength of the light beam of the second semiconductor laser is longer than the first wavelength of the light beam of the first semiconductor laser, the number of the photodetectors provided at the other side for receiving the diffracted light derived from the 0th order main beam is greater than that of the photodetectors provided at the one side for receiving the diffracted light derived from the 0th order main beam, the photodetectors provided at the one side are nearer to the first semiconductor laser than the second semiconductor laser, and the photodetectors provided at the one side are provided away from each other.

5. The optical pickup according to claim 4, wherein at least one of the photodetectors provided at the other side for receiving the diffracted light derived from the 0th order main beam has a longer dimension in the direction of the extended line than those of the photodetectors provided at the one side for receiving the diffracted light derived from the 0th order main beam.

6. The optical pickup according to claim 4, wherein each of the plurality of photodetectors is separated with an interval.

7. The optical pickup according to any one of claims 1 and 4, wherein at least at a side behind the first semiconductor laser when viewed from the position of the second semiconductor laser, when diffracted light generated by the hologram element from the light beam of the first wavelength reflected by an information recording medium and diffracted light generated by the hologram element from the light beam of the second wavelength reflected by an information recording medium have the same diffraction order, these diffracted light impinge on the same photodetector.

* * * * *